United States Patent
Inaba et al.

(10) Patent No.: US 7,650,761 B2
(45) Date of Patent: Jan. 26, 2010

(54) REFRIGERATING DEVICE COMPRISING WASTE HEAT UTILIZATION EQUIPMENT

(75) Inventors: Atsushi Inaba, Kariya (JP); Yasushi Yamanaka, Nakashima-gun (JP); Shigeru Hisanaga, Kariya (JP); Takashi Yamanaka, Kariya (JP); Hironori Asa, Okazaki (JP); Hiroshi Kisita, Anjo (JP)

(73) Assignees: DENSO CORPORATION, Kariya (JP); Nippon Soken, Inc., Aichi-pref. (JP)

( * ) Notice: Subject to any disclaimer, the term of this patent is extended or adjusted under 35 U.S.C. 154(b) by 0 days.

(21) Appl. No.: 12/151,337

(22) Filed: May 6, 2008

(65) Prior Publication Data

US 2008/0216501 A1 Sep. 11, 2008

Related U.S. Application Data

(62) Division of application No. 11/194,370, filed on Aug. 1, 2005, now abandoned.

(30) Foreign Application Priority Data

Aug. 3, 2004 (JP) .............................. 2004-227006

(51) Int. Cl.
*F25B 27/02* (2006.01)
(52) U.S. Cl. .................................... 62/238.6; 62/323.1
(58) Field of Classification Search .................. 62/172, 62/236, 238.6–238.7, 331–333, 323.1
See application file for complete search history.

(56) References Cited

U.S. PATENT DOCUMENTS 4,178,772 A 12/1979 Swenson et al.

(Continued)

FOREIGN PATENT DOCUMENTS

JP 56-043018 4/1981

(Continued)

OTHER PUBLICATIONS

Office Action dated Mar. 2, 2009 in the corresponding JP patent application No. 2004-227006.

*Primary Examiner*—William E Tapolcai
(74) *Attorney, Agent, or Firm*—Harness, Dickey & Pierce, P.L.C.

(57) ABSTRACT

In a refrigerating device comprising waste heat utilization equipment having: a refrigerating cycle 200 formed by sequentially connecting a compressor 210, a condenser 220, an expansion valve 240, and an evaporator 250; and a Rankine cycle 300 formed by sequentially connecting a heater 310 using the waste heat of a heat generating device (for example, an internal combustion engine) 10 as a heating source, an expansion device 320, the above-mentioned condenser 220, and a pump 330, in which the drive shafts of the compressor 210 and the expansion device 320 are separated from each other. Then, the output of the expansion device 320 is used mainly for generating electricity.

16 Claims, 3 Drawing Sheets

U.S. PATENT DOCUMENTS

| | | |
|---|---|---|
| 4,199,961 A | 4/1980 | Carter et al. |
| 4,216,659 A * | 8/1980 | French .................. 62/186 |
| 4,218,891 A | 8/1980 | Schwartzman |
| 4,526,013 A | 7/1985 | Joy |
| 5,129,236 A | 7/1992 | Solomon |
| 2004/0088992 A1 | 5/2004 | Brasz et al. |
| 2004/0088993 A1 | 5/2004 | Radcliff et al. |
| 2004/0187506 A1 | 9/2004 | Iwanami et al. |
| 2004/0255593 A1 | 12/2004 | Brasz et al. |

FOREIGN PATENT DOCUMENTS

| | | |
|---|---|---|
| JP | 02-282661 | 11/1990 |
| JP | 11-132594 | 5/1999 |
| JP | 2004-012110 | 1/2004 |
| JP | 2006-506570 | 2/2006 |

* cited by examiner

REFRIGERATING DEVICE COMPRISING WASTE HEAT UTILIZATION EQUIPMENT

CROSS-REFERENCE TO RELATED APPLICATIONS

This application is a divisional of U.S. patent application Ser. No. 11/194,370 filed on Aug. 1, 2005. This application claims the benefit of JP 2004-227006, filed Aug. 3, 2004. The disclosures of the above applications are incorporated herein by reference.

BACKGROUND OF THE INVENTION

1. Field of the Invention

The present invention relates to a refrigerating device comprising waste heat utilization equipment, for recovering power by utilizing waste heat of a heat generating device, and is preferably applied to a vehicle having an internal combustion engine.

2. Description of the Related Art

As a conventional refrigerating device, for example, one disclosed in Patent document 1 is known. The refrigerating device has a Rankine cycle, utilizing cooling waste heat included in a cooling medium, such as a cooling water, for cooling an internal combustion engine as a heat generating device, and a refrigerating cycle, and the output shaft of an expansion device in the Rankine cycle is connected to the shaft of a compressor in the refrigerating cycle. Due to this, it is possible to drive the compressor by using power (output of the expansion device) recovered in the Rankine cycle and air-conditioning is enabled while the load imposed on the internal combustion engine is reduced.

[Patent document 1] Japanese Unexamined Patent Publication (Kokai) No. 56-43018

However, in the above-mentioned refrigerating device, air-conditioning is not possible when waste heat cannot be recovered such as when an internal combustion engine is in a warm-up state. For example, in the case where the refrigerating device is applied to a vehicle, even if the cooling of the vehicle is required after it has been exposed to the heat of the sun in summer, and despite a strong demand for air-conditioning, it is not possible to perform air-conditioning until warm-up of the engine is completed because the compressor cannot be driven by an expansion device.

SUMMARY OF THE INVENTION

The above-mentioned problem being taken into consideration, the object of the present invention is to provide a refrigerating device comprising waste heat utilization equipment capable of air conditioning even if there is no waste heat from a heat generating device.

In order to attain the above-mentioned object, the present invention employs the following technical means.

In a first aspect of the present invention, a refrigerating device comprising waste heat utilization equipment having a refrigerating cycle (200) formed by sequentially connecting a compressor (210), a condenser (220), an expansion valve (240), and an evaporator (250) and a Rankine cycle (300) formed by sequentially connecting a heater (310) using waste heat of a heat generating device (10) as a heating source, an expansion device (320), the above-mentioned condenser (220), and a pump (330), is characterized in that the drive shafts of the compressor (210) and the expansion device (320) are separated from each other.

Due to this, it is possible to operate the refrigerating cycle (200) using the compressor (210) even when the expansion device (320) cannot be operated because a sufficient amount of waste heat cannot be obtained from the heat generating device (10) and, therefore, air-conditioning is possible.

In a second aspect of the present invention, preferably, an internal combustion engine (10) is used as the heat generating device (10).

In a third aspect of the present invention according to the first or second aspect, it is preferable to use the output of an expansion device (320) for generating electricity and, due to this, it is possible to reduce the load of generating electricity imposed on an internal combustion engine (10).

In a fourth aspect of the present invention, it may be possible to use the output of an expansion device (320) for driving a pump (330) and, due to this, it is possible to reduce the energy for driving the pump (330).

A fifth aspect of the present invention is characterized in that a compressor (210) is driven by an internal combustion engine (10) and, due to this, regardless of the presence or absence of the output of an expansion device (320), it is possible not only to operate the compressor (210) but also to effectively utilize the waste heat of the internal combustion engine (10) in accordance with the output of the expansion device (320).

In a sixth aspect of the present invention, it may be possible to drive a compressor (210) by an electric motor (213) or, in a seventh aspect of the present invention, it may be possible to drive a compressor (10) by at least one of the internal combustion engine (10) and the electric motor (213).

In an eighth aspect of the present invention, the refrigerating device further comprises an electric generator (321) driven by the expansion device (320), a control circuit (41), and at least a battery (40). The control circuit (41) controls the generation of electricity by the electric generator (321) in accordance with the amount of electric energy stored in the battery (40) by controlling the rotation speed of the electric generator (321).

According to this aspect, it is also possible to reduce the load of generating electricity imposed on an internal combustion engine (10) and, as a result, it is possible to improve the fuel consumption efficiency of a vehicle as a whole.

In a ninth aspect of the present invention, the refrigerating device further comprises at least a battery (40) and a main electric generator (60) driven by the internal combustion engine (10). The main electric generator (60) comprises a control means (61) for controlling the amount of electricity to be generated in accordance with the amount of electric energy stored in the battery (40).

In a tenth aspect of the present invention, the refrigerating device is mounted on a hybrid vehicle. The hybrid vehicle comprises a motor generator and at least a battery (40). The motor generator comprises a control means (61) for controlling the amount of electricity to be generated in accordance with the amount of electric energy stored in the battery (40).

In an eleventh aspect of the present invention according to the eighth aspect, the electricity generation control of the electric generator (321) is carried out by controlling the rotation speed of an electric motor (331) for driving the pump (330).

The present invention may be more fully understood from the description of the preferred embodiments of the invention set forth below, together with the accompanying drawings.

DESCRIPTION OF THE PREFERRED EMBODIMENTS

First Embodiment

Figure 1:
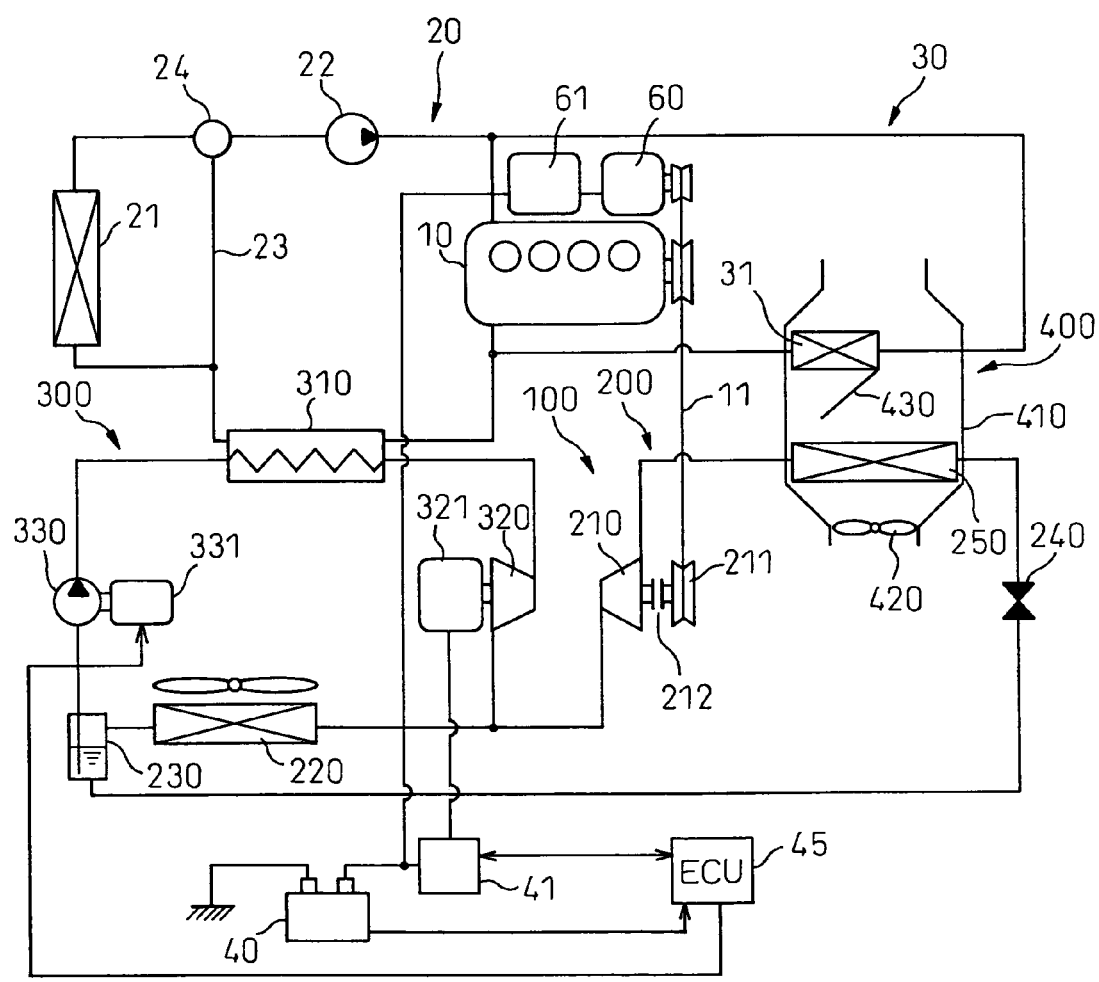
FIG. 1 is a schematic diagram showing a general view of a refrigerating device comprising waste heat utilization equipment in a first embodiment of the present invention.

A first embodiment of the present invention is shown in FIG. 1 and a concrete configuration thereof is explained first. In this embodiment, a refrigerating device comprising waste heat utilization equipment (hereinafter, referred to as a refrigerating device) 100 of the present invention is applied to a vehicle using an engine 10 as a drive source. The refrigerating device 100 is provided with a refrigerating cycle 200 and a Rankine cycle 300 and the respective operations of the respective cycles 200 and 300 are controlled by a control unit, not shown.

The engine 10 is a water-cooling internal combustion engine (corresponding to a heat generating device in the present invention) and a radiator circuit 20 for cooling the engine 10 by means of circulation of engine cooling water and a heater circuit 30 for heating conditioned air using the cooling water (hot water) as a heat source, are provided.

The radiator circuit 20 is provided with a radiator 21 and the radiator 21 cools the cooling water caused to circulate by a hot water pump 22 by effecting heat exchange with the outside air. Here, an electric pump is employed as the hot water pump 22. In the channel at the outlet of the engine 10 (channel between the engine 10 and the radiator 21), a heater 310 of the Rankine cycle 300, which will be described later, is arranged and the cooling water is caused to flow through the heater 310. In the radiator circuit 20, a radiator bypass channel 23 through which cooling water flows while bypassing the radiator 21 is provided and a thermostat 24 adjusts the flow rate of cooling water flowing through the radiator 21 and the flow rate of cooling water flowing through the radiator bypass channel 23.

In the heater circuit 30, a heater core 31 is provided and the above-mentioned hot water pump 22 circulates cooling water (hot water). The heater core 31 is arranged in an air conditioning case 410 of an air conditioning unit 400 and heats conditioned air supplied by a fan 420 by effecting heat exchange with hot water. Further, the heater core 31 is provided with an air mix door 430 and the flow rate of conditioned air flowing through the heater core 31 is changed by opening/closing the air mix door 430.

The refrigerating cycle 200 comprises, as is well known, a compressor 210, a condenser 220, a receiver 230, an expansion valve 240, and an evaporator 250, and a closed circuit is formed by sequentially connecting these components. The compressor 210 is a fluid device for compressing a refrigerant in the refrigerating cycle 200 to a high-temperature and high-pressure state and is driven by the drive force of the engine 10. In other words, to the drive shaft of the compressor 210, a pulley 211 is fixed as a drive means, the drive force of the engine 10 is transferred to the pulley 211 via a belt 11, and thus the compressor 210 is driven. The pulley 211 is provided with an electromagnetic clutch 212 for intermittently connecting the compressor 210 and the pulley 211. The intermittent connection therebetween, by the electromagnetic clutch 212, is controlled by a control unit, not shown.

The condenser 220 is a heat exchanger connected to the outlet of the compressor 210 for condensing and liquefying the refrigerant by effecting heat exchange with outside air. The receiver 230 is a receiver for separating the refrigerant condensed by the condenser 220 into a gas-liquid two-phase, that is, gas and liquid, and causes only the liquefied refrigerant separated here to flow out toward the expansion valve 240. The expansion valve 240 reduces in pressure, and expands, the liquefied refrigerant from the receiver 230 and, in the present embodiment, a temperature-sensitive expansion valve is employed that reduces in pressure the refrigerant isenthalpically and controls the throttle opening degree so that the degree of superheat of the refrigerant sucked by the compressor 210 is a predetermined value.

The evaporator 250, which is arranged in the air conditioning case 410 of the air conditioning unit 400, similarly to the heater core 31, is a heat exchanger for cooling conditioned air from the fan 420 by using latent heat produced when the refrigerant that has been reduced in pressure and expanded is evaporated by the expansion valve 240. Then, the refrigerant outlet of the evaporator 250 is connected to the suction side of the compressor 210. The ratio of the conditioned air cooled by the evaporator 250 to the conditioned air heated by the heater core 31 is changed in accordance with the opening degree of the air mix door 430 and the temperature is adjusted to a temperature set by a passenger.

On the other hand, the Rankine cycle 300 recovers waste heat energy produced by the engine 10 (thermal energy of cooling water) and utilizes the waste heat energy by converting it into electric energy. The Rankine cycle 300 is explained below.

The Rankine cycle 300 comprises the heater 310, an expansion device 320, the condenser 220, the receiver 230, and a pump 330 and a closed circuit is formed by sequentially connecting these components. The operative fluid flowing through the Rankine cycle 300 is the same as the refrigerant in the above-mentioned refrigerating cycle 200 and the condenser 220 and the receiver 230 used in the refrigerating cycle 200 are also used here.

The pump 330 is an electric pump using an electric motor 331 operated by a control unit, not shown, as a drive source and circulates the refrigerant in the Rankine cycle 300. The heater 310 is a heat exchanger for heating the refrigerant by effecting heat exchange between the refrigerant sent from the pump 330 and the hot cooling water flowing through the radiator circuit 20. The expansion device 320 is a fluid device for generating a rotational drive force by the expansion of the superheated steam refrigerant heated by the heater 310. The refrigerant discharged from the expansion device 320 flows up to the condenser 220 and the receiver 230 described above.

In the present invention, the drive shaft of the expansion device 320 and the drive shaft of the compressor 210 are completely separated and an electric generator 321 is connected to the expansion device 320. Then, as described later, the electric generator 321 is operated by the drive force of the expansion device 320 and the electric power generated by the electric generator 321 is used to charge a battery 40 via a control circuit 41.

Next, the operation, the function and the effect of the above-mentioned configuration are explained below.

1. Stand-Alone Operation of Refrigerating Cycle

When waste heat cannot be obtained during warm-up immediately after the engine 10 is started, etc., the electric motor 331 of the pump 330 is stopped (the expansion device 320 is stopped), the electromagnetic clutch 212 is connected, the compressor 210 is driven by the drive force of the engine 10, and the refrigerating cycle 200 is operated stand-alone. In this case, the operation is the same as that of a normal air conditioner for a vehicle.

2. Stand-Alone Operation of Rankine Cycle

When an air conditioner is not required to operate and a sufficient amount of waste heat of the engine 10 is obtained, the electromagnetic clutch 212 is disconnected (the compressor 210 is stopped), the electric motor 331 (pump 330) is operated, and the Rankine cycle 300 is operated, stand-alone, to generate electricity.

In this case, the pressure of the liquid refrigerant in the receiver 230 is increased by the pump 330, and the liquid refrigerant is sent to the heater 310, then is heated by the hot engine cooling water in the heater 310, and is turned into a superheated steam refrigerant, which is then sent to the expansion device 320. In the expansion device 320, the superheated steam refrigerant is expanded and reduced in pressure isentropically, and part of the thermal energy and the pressure energy thereof is converted into a rotational drive force. The electric generator 321 is operated by the rotational drive force taken out in the expansion device 320 and then the electric generator 321 generates electricity. Then, the electric power generated by the electric generator 321 is used to charge up the battery 40 via the control circuit 40 and is used to operate various auxiliary devices. The refrigerant reduced in pressure in the expansion device 320 is condensed in the condenser 220, separated into gas and liquid in the receiver 230, and then sucked by the pump 330 again.

The control circuit 41 controls the rotation speed of the electric generator 321 and thus controls the generation of electricity by the electric generator 321 in accordance with the amount of electric energy stored in the battery 40. Due to this, it is possible to convert the power obtained in the Rankine cycle into electric energy and to store it in the battery 40 in an optimum form and, further, to reduce the load of an electricity generation means (for example, an alternator) 60 driven by an engine, which is a drive source for operating a vehicle, in accordance with the amount of electricity stored in the battery 40, and thus, to improve the fuel consumption efficiency of a vehicle as a whole.

The alternator 60 comprises a control means 61 such as a regulator that controls the amount of electricity to be generated in accordance with the amount of electric energy stored in the battery 40.

3. Simultaneous Operation of Refrigerating Cycle and Rankine Cycle

When an air conditioner is required to operate and a sufficient amount of waste heat is available, the refrigerating cycle 200 and the Rankine cycle 300 are operated simultaneously and both air conditioning and electricity generation are carried out.

In this case, the electromagnetic clutch 212 is connected and the electric motor 331 (the pump 330) is operated. Both the cycles 200 and 300 share the condenser 220 and the refrigerant flow branches in the receiver 230 and circulates through the respective channels. The operation of each of the cycles 200 and 300 is the same as that in the case of the stand-alone operation described above.

Due to this, even when a sufficient amount of waste heat of the engine 10 cannot be obtained and the expansion device 320 cannot be operated, the operation of the refrigerating cycle 200 becomes possible, because the compressor 210 is separated from the expansion device 320, and air conditioning can be carried out.

Then, when a sufficient amount of waste heat of the engine 10 can be obtained, regardless of the operation state of the refrigerating cycle 200, electricity generation becomes possible by utilizing the waste heat of the engine 10, the load of generating electricity imposed on the engine 10 (the load to operate the alternator) can be reduced, and thus the fuel consumption efficiency can be improved.

Second Embodiment

Figure 2:
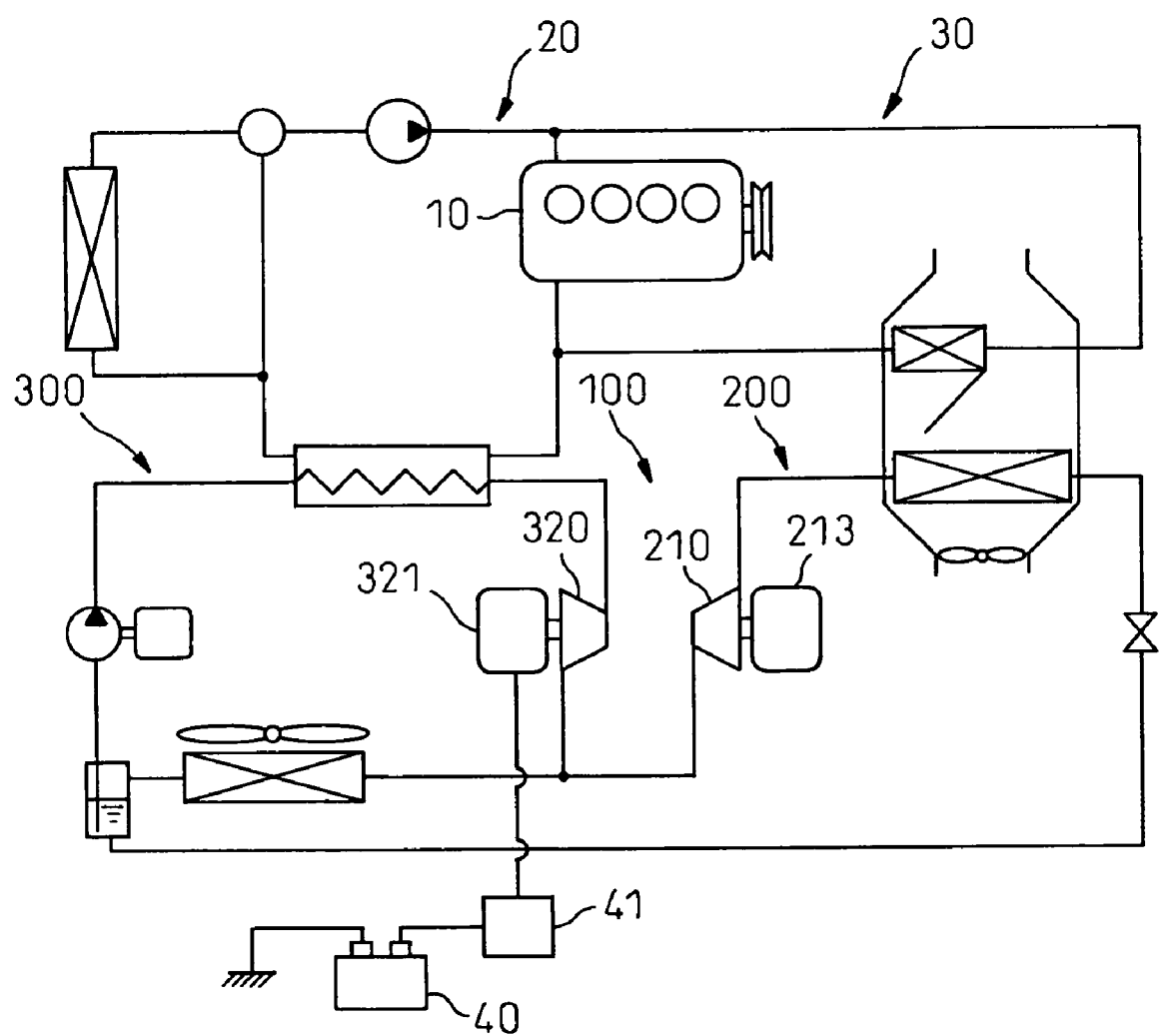
FIG. 2 is a schematic diagram showing a general view of a refrigerating device comprising waste heat utilization equipment in a second embodiment of the present invention.

A second embodiment of the present invention is shown in FIG. 2. In the second embodiment, the drive means of the compressor 210 in the first embodiment is modified. In other words, here, the compressor 210 is connected to an electric motor 213 (that is, the compressor is an electric compressor) and is driven by the drive force of the electric motor 213. Due to this, the same effect as that in the first embodiment can be obtained.

The compressor 210 may be a hybrid compressor capable of selecting at least one of the engine 10 and the electric motor 213 as a drive means.

Third Embodiment

Figure 3:
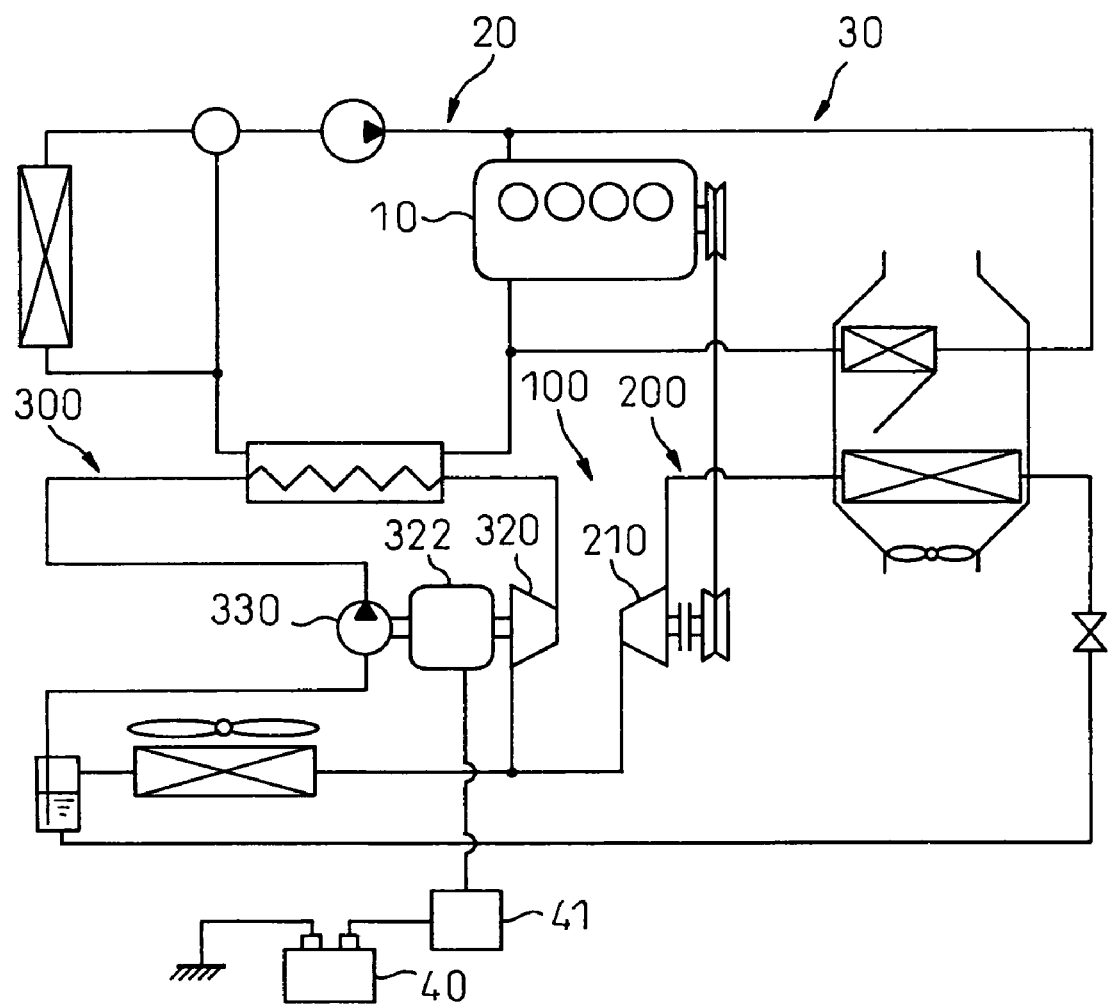
FIG. 3 is a schematic diagram showing a general view of a refrigerating device comprising waste heat utilization equipment in a third embodiment of the present invention.

A third embodiment of the present invention is shown in FIG. 3. In the third embodiment, the drive source of the pump 330 in the first embodiment is modified. Here, instead of the electric motors 321 in the first and second embodiments, an electric generator 322 having both functions of an electric motor and an electric generator is connected to the expansion device 320, and further, the pump 330 and the electric generator 322 are connected to each other.

In the third embodiment, when the Rankine cycle is operated, first the electric generator 322 is operated as an electric motor to drive the pump 330. Then, when a sufficient amount of waste heat can be obtained from the engine 10 and the drive force of the expansion device 320 exceeds the power of the pump 330, the electric-motor driven electric generator 322 is operated as an electric generator to generate electricity.

Due to this, the dedicated drive source (the electric motors 331 in the above-mentioned first and second embodiments) for driving the pump 330 can be dispensed with, the configuration can be simplified and the energy for driving the pump 330 can be reduced.

Other Embodiments

In the first to third embodiments, the engine (internal combustion engine) 10 for a vehicle is used as a heat generating device, but the heat generating device is not limited to this and any device, such as an external combustion engine, a fuel cell stack for a fuel cell powered vehicle, various motors, and an inverter, which produces heat during operation and wastes part of the heat (waste heat is produced) for a temperature control of the device can be applicable.

The alternator comprising a regulator is taken as an example of an electricity generation means driven by the drive source for operating a vehicle in accordance with the amount of electric energy stored in the battery, but the present invention is not limited to this and it may be possible to provide a control means for controlling a motor generator mounted on a hybrid vehicle, in accordance with the amount of electric energy stored in the battery.

As another method for carrying out the electricity generation control of the electric generator 321, it may be possible to control the electricity generation of the electric generator 321 by controlling the rotation speed of the electric motor 331 for driving the pump 330.

While the invention has been described by reference to specific embodiments chosen for the purposes of illustration, it should be apparent that numerous modifications could be made thereto, by those skilled in the art, without departing from the basic concept and scope of the invention.

What is claimed is:

1. A refrigerating device comprising waste heat utilization equipment having:
    a refrigerating cycle comprising a compressor, a condenser, an expansion valve, and an evaporator which are sequentially connected;
    a Rankine cycle comprising a heater using the waste heat of a heating device as a heating source, an expansion device, the condenser, and a pump, which are sequentially connected,
    an electric generator driven by the expansion device,
    a control circuit, and
    at least a battery, wherein
    the control circuit controls the electricity generation of the electric generator, in accordance with an amount of electric energy stored in the battery by controlling the rotation speed of the electric generator;
    drive shafts of the compressor and the expansion device are separated from each other, and
    the compressor is driven by an electric motor.

2. The refrigerating device comprising waste heat utilization equipment as set forth in claim 1, wherein the heat generating device is an internal combustion engine.

3. The refrigerating device comprising waste heat utilization equipment as set forth in claim 2, wherein the compressor is driven by at least one of the internal combustion engine and the electric motor.

4. The refrigerating device comprising waste heat utilization equipment as set forth in claim 2, further comprising:
    a main electric generator driven by the internal combustion engine, wherein
    the main electric generator comprises means for controlling the amount of electricity to be generated by the main electric generation in accordance with the amount of electric energy stored in the battery.

5. The refrigerating device comprising waste heat utilization equipment as set forth in claim 1, wherein output of the expansion device is used for generating electricity.

6. The refrigerating device comprising waste heat utilization equipment as set forth in claim 1, wherein output of the expansion device is used for driving the pump.

7. The refrigerating device comprising waste heat utilization equipment as set forth in claim 1, wherein:
    the electricity generation control of the electric generator is carried out by controlling the rotation speed of an electric motor for driving the pump.

8. The refrigerating device comprising waste heat utilization equipment as set forth in claim 1, wherein the refrigerating device is mounted on a hybrid vehicle, the hybrid vehicle comprises:
    a motor generator, wherein
    the motor generator comprises means for controlling the amount of electricity to be generated by the motor generator in accordance with the amount of electric energy stored in the battery.

9. A refrigerating device comprising waste heat utilization equipment having:
    a refrigerating cycle comprising a compressor, a condenser, an expansion valve, and an evaporator which are sequentially connected; and
    a Rankine cycle comprising a heater using the waste heat of a heating device as a heating source, an expansion device, the condenser, and a pump, which are sequentially connected,
    an electric generator driven by the expansion device,
    a control circuit, and
    at least a battery, wherein
    drive shafts of the compressor and the expansion device are separated from each other, and
    the control circuit controls the electricity generation of the electric generator, in accordance with amount of electric energy stored in the battery by controlling the rotation speed of the electric generator.

10. The refrigerating device comprising waste heat utilization equipment as set forth in claim 9, wherein the heat generating device is an internal combustion engine.

11. The refrigerating device comprising waste heat utilization equipment as set forth in claim 10, wherein the compressor is driven by the internal combustion engine.

12. The refrigerating device comprising waste heat utilization equipment as set forth in claim 10, wherein the compressor is driven by at least one of the internal combustion engine and the electric motor.

13. The refrigerating device comprising waste heat utilization equipment as set forth in claim 10, further comprising a main electric generator driven by the internal combustion engine, wherein the main electric generator comprises a control means for controlling the amount of electricity to be generated in accordance with amount of electric energy stored in the battery.

14. The refrigerating device comprising waste heat utilization equipment as set forth in claim 9, wherein output of the expansion device is used for driving the pump.

15. The refrigerating device comprising waste heat utilization equipment as set forth in claim 9, wherein the refrigerating device is mounted on a hybrid vehicle, the hybrid vehicle comprises a motor generator including a control means for controlling the amount of electricity to be generated in accordance with the amount of electric energy stored in the battery.

16. The refrigerating device comprising waste heat utilization equipment as set forth in claim 9, wherein the pump includes an electric motor to drive the pump, and
    the electricity generation control of the electric generator is carried out by controlling the rotation speed of the electric motor for driving the pump.

* * * * *